M. J. J. B. RICHARD.
FEEDING TROUGH FOR ANIMALS.
APPLICATION FILED DEC. 22, 1911.

1,096,753.

Patented May 12, 1914.

Witnesses:
C. D. Swett,
B. H. Davis.

Inventor:
Marie J. J. B. Richard
by G. Dittmar
Attorney.

UNITED STATES PATENT OFFICE.

MARIE JOSEPH JEAN BAPTISTE RICHARD, OF FLAGEY, FRANCE.

FEEDING-TROUGH FOR ANIMALS.

1,096,753.  Specification of Letters Patent.  Patented May 12, 1914.

Application filed December 22, 1911. Serial No. 667,331.

*To all whom it may concern:*

Be it known that I, MARIE JOSEPH JEAN BAPTISTE RICHARD, citizen of the French Republic, residing at Flagey, Haute-Marne, France, have invented certain new and useful Improvements in Feeding-Troughs for Animals, of which the following is a specification, reference being had therein to the accompanying drawing.

This invention relates to a feeding-trough for animals and it has for its object to provide means whereby the said trough can be turned over for the purpose of a more perfect cleaning, the turning over being effected by a crank and lever mechanism.

A trough of the kind above mentioned is illustrated in the annexed drawing in which—

Figure 1:
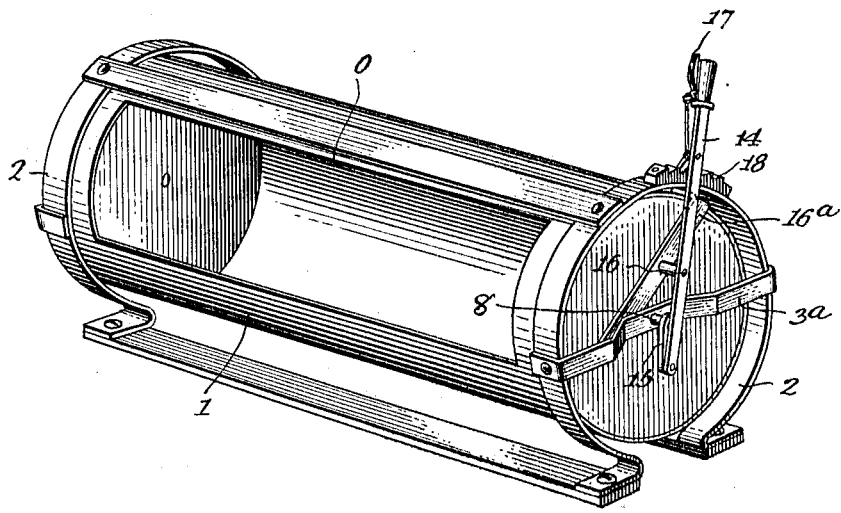
Figure 2:
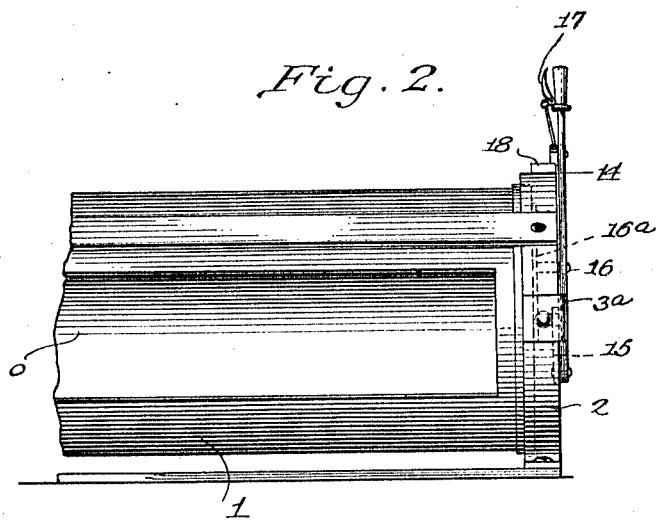

Figure 1 is a perspective vew of the device, and Fig. 2 is a side elevation of a part of the device.

The various features of the device are referred to by figures similar figures denoting corresponding parts in the several views.

In the drawing the numeral 1 designates a hollow cylinder provided with a longitudinal aperture O and carried by a frame 2, the trunnions of the said cylinder being fixed to its ends and passing through the cross-bars 3ª.

In the construction shown in the drawings the turning over of the cylinder is effected by means of a lever 14 acting on a crank 15 fixed upon one of the trunnions of the cylinder outside the bar 3ª. The lever 14 is pivoted at 16 on a bar 16ª fixed on the cylinder in such a manner that the distance between the point 16 and the cylinder trunnion 8 is equal to the radius of the crank 15. Like changing speed levers, the said lever 14 has a stop projection with a handle 17, engaging teeth 18 so that it can be set in position according to the height above the ground.

Having now described my invention and the manner of using it, what I claim and desire to secure by Letters Patent, is,—

1. In a feeding trough a frame having foot supports and vertical annular ends, longitudinal supports whose ends are secured on said frame ends, a cylindrical food holder in said frame, trunnions on said food holder, strips across the ends of said frame and secured thereto in which said trunnions are journaled, a crank on the projecting end of one of said trunnions, a hand lever fulcrumed on the end of the food-holder and whose end is jointed to the end of said crank, a ratchet on said frame and means on said hand lever to engage said ratchet, as described.

2. In a feeding trough a frame having foot supports and vertical annular ends, longitudinal supports whose ends are secured on said frame ends, a cylindrical food holder in said frame, trunnions on said food holder, strips across the ends of said frame and secured thereto in which said trunnions are journaled, a crank on the projecting end of one of said trunnions, a hand-lever fulcrumed on said food-holder and whose end is jointed to the end of said crank, the distance between the pivot on which said lever turns and the cylinder trunnion being equal to the radius of said crank, a ratchet on said frame and means on said lever to engage said ratchet.

In testimony whereof I affix my signature in the presence of two witnesses.

MARIE JOSEPH JEAN BAPTISTE RICHARD.

Witnesses:
 VICTOR PRÉVOST,
 GEORGE RIGOT.

---

Copies of this patent may be obtained for five cents each, by addressing the "Commissioner of Patents, Washington, D. C."